United States Patent

Hirahara et al.

Patent Number: 5,356,844
Date of Patent: Oct. 18, 1994

[54] DIELECTRIC CERAMIC COMPOSITION AND DIELECTRIC RESONATOR

[75] Inventors: Seiichiro Hirahara; Nobuyoshi Fujikawa; Shinichi Enami; Toyomi Nishi, all of Kokubu, Japan

[73] Assignee: Kyocera Corporation, Kyoto, Japan

[21] Appl. No.: 82,024

[22] Filed: Jun. 23, 1993

[30] Foreign Application Priority Data

Jun. 24, 1992 [JP] Japan .................. 4-165889
May 18, 1993 [JP] Japan .................. 4-115562

[51] Int. Cl.$^5$ .................................. C04B 35/46
[52] U.S. Cl. .......................................... 501/136
[58] Field of Search ............................... 501/136

[56] References Cited

U.S. PATENT DOCUMENTS

| | | | |
|---|---|---|---|
| 4,542,111 | 9/1985 | Buran et al. | 501/136 |
| 4,591,574 | 5/1986 | Ando et al. | 501/136 |
| 4,614,725 | 9/1986 | Ando et al. | 501/136 |
| 4,668,646 | 5/1987 | Ando et al. | 501/136 |

*Primary Examiner*—Mark L. Bell
*Assistant Examiner*—Deborah Jones
*Attorney, Agent, or Firm*—Spensley Horn Jubas & Lubitz

[57] ABSTRACT

A dielectric ceramic composition which contains a rare earth element (Ln), Al, Ca and Ti as metal elements and which when these components are expressed in terms of a mole ratio as $aLn_2O_x \cdot bAl_2O_3 \cdot cCaO \cdot dTiO_2$, the values of a, b, c, d and x satisfy $a+b+c+d=1$, $0.056 \leq a \leq 0.214$, $0.056 \leq b \leq 0.214$, $0.286 \leq c \leq 0.500$, $0.230 \leq d \leq 0.470$, and $3 \leq x \leq 4$. The dielectric having the above composition is disposed between a pair of input and output terminals to constitute a dielectric resonator. The dielectric ceramic composition exhibits such dielectric properties as a large dielectric constant at high frequencies, a large Q-value and a small temperature coefficient of resonance frequency. Satisfactory properties are exhibited when the dielectric ceramic composition is used for a resonator or as a material of circuit board for high-frequency applications.

8 Claims, 1 Drawing Sheet

F I G. 1
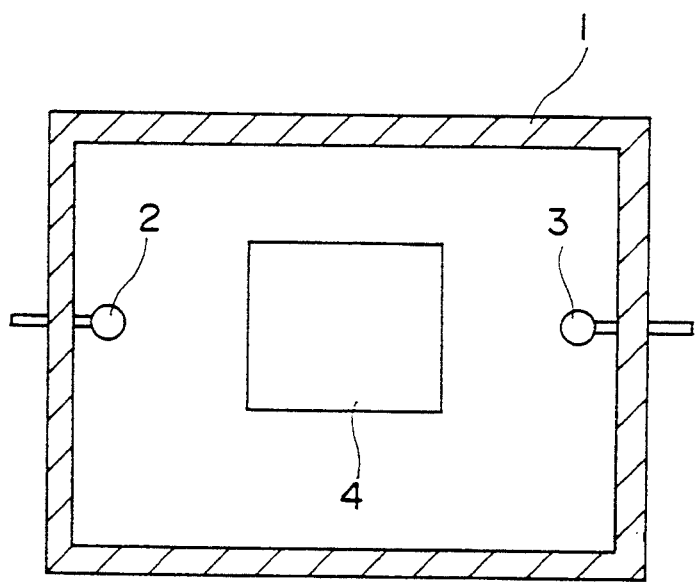

DIELECTRIC CERAMIC COMPOSITION AND DIELECTRIC RESONATOR

BACKGROUND OF THE INVENTION

1. Field of the Invention

The present invention relates to a novel dielectric ceramic composition suited as a material of resonators and circuit boards used in the microwave region mounted, for example, on mobile phones, cordless telephones, personal wireless telephony and satellite broadcast receivers, and to a dielectric resonator.

2. Description of the Prior Art

In recent years, dielectric ceramics have been widely used in the microwave region accompanying the realization of mobile phones, cordless telephones, personal wireless telephony and satellite broadcast receivers. The dielectric ceramics for microwave applications are chiefly used for the resonators requiring, however, the following three properties to be satisfied—(1) the dielectric ceramic should exhibit a large dielectric constant relative to its size that is urged to be reduced, since the wavelength is contracted to $1/\epsilon r^{\frac{1}{2}}$ in the dielectric, (2) the dielectric ceramic should exhibit small dielectric loss at high frequencies, i.e., should have a high Q-value, and (3) the dielectric ceramic should exhibit a resonance frequency that changes little with a change in the temperature, i.e., should have a small temperature dependence of the dielectric constant and should remain stable.

Dielectric ceramics of this kind which have been known so far include oxide ceramic materials such as $BaO-TiO_2$ type material, $BaO-REO-TiO_2$ (where REO denotes an oxide of a rare earth element) type material, $MgTiO_3-CaTiO_3$ type material and like materials (see, for example, Japanese Laid-Open Patent Publications Nos. 10806/1986, 100058/1988 and 19603/1985).

The $BaO-TiO_2$ type material exhibits a dielectric constant $\epsilon r$ which is as great as 37 to 40 and a Q-value of as great as 40,000. It is, however, difficult to obtain the $BaO-TiO_2$ type material which exhibits a temperature coefficient $\tau f$ of resonance frequency which is zero in a single phase. Moreover, the $BaO-TiO_2$ type material permits the dielectric constant to greatly change with a change in the composition and further permits the dielectric constant to greatly change depending upon the temperature. With this material, therefore, it is difficult to stably decrease the temperature coefficient $\tau f$ of resonance frequency maintaining a large dielectric constant and a small dielectric loss.

As for the $BaO-REO-TiO_2$ material, there has been known a $BaO-Nd_2O_3-TiO_2$ type material or a $BaO-Sm_2O_3-TiO_2$ type material. However, though these materials exhibit dielectric constants $\epsilon r$ of as very great as 40 to 60 and a temperature coefficient $\tau f$ of resonance frequency which is zero, their Q-values are as small as 5000 or less.

Moreover, the $MgTiO_3-CaTiO_3$ type material exhibits a Q-value which is as great as 30,000 and a temperature coefficient $\tau f$ of resonance frequency which is zero, but exhibits a dielectric constant $\epsilon r$ which is as small as 16 to 25.

Thus, none of the above-mentioned materials fully satisfy the aforementioned three properties required for the dielectric material for high-frequency applications.

The present invention was contrived in view of the above-mentioned defects, and provides a dielectric ceramic composition which has a large dielectric constant, a large Q-value, small temperature dependence of the dielectric constant and remains stable, and a dielectric resonator.

In order to solve the above-mentioned problems, the present inventors have forwarded the study and have discovered that a dielectric ceramic composition could be obtained having a large dielectric constant, a large Q-value, small temperature dependence of the dielectric constant and which is stable if the composition is composed of $Ln_2O_x$, $Al_2O_3$, $CaO$, and $TiO_2$ (Ln is at least one or more kinds of rare earth elements, and $3 \leq x \leq 4$) which are adjusted to lie over a particular range.

That is, the dielectric ceramic composition of the present invention contains, as metal elements, a rare earth element (Ln), Al, Ca and Ti. Here, when these components are expressed in terms of a molar ratio as $aLn_2O_x \cdot bAl_2O_3 \cdot cCaO \cdot dTiO_2$, the values of a, b, c, d and x satisfy $a+b+c+d=1$, $0.056 \leq a \leq 0.214$, $0.056 \leq b \leq 0.213$, $0.286 \leq c \leq 0.500$, $0.230 \leq d \leq 0.470$, and $3 \leq x \leq 4$. Moreover, the dielectric resonator of the present invention comprises a dielectric ceramic disposed between a pair of input and output terminals and operates relying upon the electromagnetic coupling, wherein the dielectric ceramic contains, as metal elements, a rare earth element (Ln), Al, Ca and Ti. Here, when these components are expressed in terms of a molar ratio as $aLn_2O_x \, bAl_2O_3 \, cCaO \, dTiO_2$, the values of a, b, c, d and x satisfy $a+b+c+d=1$, $0.056 \leq a \leq 0.214$, $0.056 \leq b \leq 0.214$, $0.286 \leq c \leq 0.500$, $0.230 \leq d \leq 0.470$, and $3 \leq x \times \leq 4$.

The dielectric ceramic composition of the present invention is a composite oxide containing a rare earth element (Ln), Al, Ca and Ti as metal elements. Described below is the reason why the composition is limited within the above-mentioned ranges.

The range $0.056 \leq a \leq 0.214$ is selected because of the reason that when $0.056 > a$, the temperature coefficient $\tau f$ becomes great having a positive sign and the absolute value of $\tau f$ exceeds 30. When $a > 0.214$, the dielectric constant decreases, the Q-value becomes smaller than 20,000, the temperature coefficient $\tau f$ becomes great having a negative sign and its absolute value exceeds 30. Particularly preferred range is $0.078 \leq a \leq 0.1166$.

The range $0.056 \leq b \leq 0.214$ is selected because when $0.056 > b$, the Q-value becomes smaller than 20,000 and the temperature coefficient $\tau f$ increases having a positive sign. When $b > 0.214$, the Q-value becomes smaller than 20,000. Particularly preferred range is $0.078 \leq b \leq 0.1166$.

Furthermore, the range $0.286 \leq c \leq 0.500$ is selected because when $0.286 > c$, the Q-value becomes smaller than 20,000 and when $c > 0.500$, the temperature coefficient $\tau f$ becomes great having the negative sign and its absolute value exceeds 30. Particularly preferred range is $0.390 \leq c \leq 0.47$.

Moreover, the range $0.230 < d < 0.470$ is selected because when $0.230 \geq d$, the temperature coefficient $\tau f$ becomes great having the negative sign and when $d \geq 0.470$, the Q-value becomes smaller than 20,000. Particularly preferred range is $0.340 \leq d \leq 0.422$.

Rare earth elements (Ln) may be Y, La, Ce, Pt, Sm, Eu, Gd, Dy, Er, Yb and Nd. Among them, Nd is most preferred. In the present invention, there may be used two or more kinds of rare earth elements (Ln). From the standpoint of temperature dependence of the dielectric constant, it is desired to use Y, Ce, Pr, Sm, Eu, Gd, Dy, Er and Yb.

A preferred dielectric ceramic has a composition expressed by the following formula:

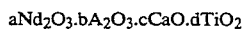

wherein a, b, c, and d have the same meaning as mentioned above.

And another preferred ceramic has a composition expressed by the following formula:

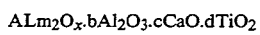

wherein Lm denotes a combination of Nd and other rare earth element selected from the group consisting of Y, La, Ce, Pr, Sm, Eu, Gd, Dy, Er and Yb, said Nd and other rare earth element being present at an atomic ratio of 9:1 to 1:9, especially 9:1 to 5:5.

According to the present invention, furthermore, the dielectric ceramic composition consists of the above-mentioned composition as main components and to which may be further added ZnO, NiO, $SnO_2$, $Co_3O_4$, $MnCO_3$, $ZrO_2$, $WO_3$, $LiCO_3$, $Rb_2CO_3$, $Sc_2O_3$, $V_2O_5$, CuO, $SiO_2$, $MgCO_3$, $Cr_2O_3$, $B_2O_3$, $GeO_2$, $Sb_2O_5$, $Nb_2O_5$, $Ta_2O_5$, and the like compound. These compounds can be added in amounts of smaller than 6% by weight though it may vary depending upon the components that are added. Among them, $Nb_2O_5$ and $Ta_2O_5$ that are added in amounts of 1 to 4% by weight help increase the dielectric constant compared with that of when they are not added, and help bring the temperature characteristics close to 0. It is therefore allowed to obtain a dielectric ceramic having excellent properties.

The dielectric ceramic composition of the present invention is prepared, for example, as described below. As starting materials, the powders of a rare earth oxide of a high purity, an aluminum oxide, a titanium oxide and a calcium carbide are weighed to be at desired ratios. Powders of $Nb_2O_5$, $Ta_2O_5$, ZnO and the like may be added to the above main components. Thereafter, pure water is added thereto and the starting materials are mixed and pulverized under the wet condition by a mill using zirconia balls for 10 to 30 hours until the average particle diameter of the mixed components becomes smaller than 1.6 μm. The mixture is dried, calcined at 1100° to 1300° C. for 1 to 4 hours, admixed with a binder in an amount of 0.8 to 5% by weight and are granulated. The obtained powder is molded into any desired shape by a molding means such as dry press, cold hydrostatic pressure press or extrusion molding, and is then fired in the open air at a temperature of 1400° to 1700° C. for 1 to 10 hours.

The dielectric resonator of the present invention, e.g., the TE-mode type resonator shown in FIG. 1 has an input terminal 2 and an output terminal 3 formed on both sides of a metal case 1, and has a dielectric ceramic 4 of the aforementioned composition which is disposed between these terminals 2 and 3. In this TE-mode type dielectric resonator, the microwaves are input through the input terminal 2 and are reflected by the boundary between the dielectric ceramic 4 and free space, and are confined in the dielectric ceramic 4 to develop resonance of a particular frequency. The signals are electromagnetically coupled to the output terminal 3 and are output. Though not diagramed, the dielectric ceramic composition of the present invention may be further adapted to a coaxial resonator of the TEM mode, a strip line resonator, a dielectric ceramic resonator of the TM mode and to any other resonators as a matter of course.

The dielectric ceramic composition of the present invention is a composite oxide containing a rare earth element (Ln), Al, Ca and Ti as metal elements. By adjusting these components within a particular range, it becomes possible to obtain a dielectric ceramic composition having a large dielectric constant, a large Q-value, small temperature dependence of the dielectric constant and which is stable.

By using the dielectric ceramic having the above-mentioned composition, furthermore, it is allowed to fabricate a dielectric resonator which operates upon the electromagnetic coupling featuring a small size, small loss, and stable resonance frequency at a temperature at which it is used.

BRIEF DESCRIPTION OF THE DRAWING

FIG. 1 is a diagram illustrating a dielectric resonator of the present invention.

EXAMPLES

As starting materials, the powders of a rare earth oxide ($Nd_2O_3$) of a high purity, an aluminum oxide ($Al_2O_3$), a titanium oxide ($TiO_2$) and a calcium carbide ($CaCO_3$) were weighed as shown in Table 1 followed by the addition of pure water. Then, the starting materials were mixed and pulverized under the wet condition in a mill for about 20 hours until the average particle diameter of the mixed components was smaller than 1.6 μm.

Impurities such as $ZrO_2$, $SiO_2$ or any other rare earth elements may be often contained in amounts of smaller than 1% by weight depending upon the type of balls in the mill and other various conditions.

The mixture was dried, calcined at 1200° C. for two hours, admixed with a binder in an amount of about 1% by weight and was granulated. The thus obtained powder was then molded into a disc under the pressure of about 1000 kg/cm² and was fired in the open air at a temperature of 1400° to 1700° C. for two hours.

The surface of the disk-like ceramic was polished, washed with ultrasonic waves in acetone, dried at 150° C. for one hour and was measured by the cylindrical resonance method for its dielectric constant, Q-value and temperature coefficient τf of resonance frequency at a frequency of 3.5 to 4.5 GHz. The Q-value was converted into a Q-value at 1 GHz from a relationship "Q-value x measuring frequency f=constant" that generally holds in the microwave dielectrics. As for the temperature coefficient τf of resonance frequency, the resonance frequencies were measured between −40° C. to +85° C., and the temperature coefficients τf were calculated over a range of −40° C. to 25° C., and a range of 25° C. to 85° C. with the resonance frequency at 25° C. as a reference. The results were as shown in Table 1.

TABLE I

| Sample No. | $Nd_2O_3$ a | $Al_2O_3$ b | CaO c | $TiO_2$ d | Dieleectric constant εr | Q-value | Temp. coefficient of resonance freq. τf (ppm/°C.) | |
|---|---|---|---|---|---|---|---|---|
| | | | | | | | −40~+25° C. | +25~+85° C. |
| 1 | 0.0800 | 0.1700 | 0.3750 | 0.3750 | 41 | 23000 | +27 | +28 |
| 2 | 0.1240 | 0.1300 | 0.3730 | 0.3730 | 35 | 54000 | −28 | −27 |

TABLE I-continued

| Sample No. | Nd₂O₃ a | Al₂O₃ b | CaO c | TiO₂ d | Dielectric constant εr | Q-value | Temp. coefficient of resonance freq. τf (ppm/°C.) −40~+25° C. | +25~+85° C. |
|---|---|---|---|---|---|---|---|---|
| 3 | 0.0790 | 0.0800 | 0.4700 | 0.3710 | 41 | 44000 | +19 | +20 |
| 4 | 0.1250 | 0.1250 | 0.3330 | 0.4170 | 39 | 32000 | −16 | −15 |
| 5 | 0.1250 | 0.1250 | 0.4170 | 0.3330 | 34 | 58000 | −29 | −28 |
| 6 | 0.1400 | 0.1250 | 0.4350 | 0.3000 | 31 | 25000 | −25 | −24 |
| 7 | 0.1061 | 0.1061 | 0.3939 | 0.3939 | 39 | 47000 | −17 | −18 |
| 8 | 0.0881 | 0.0881 | 0.4119 | 0.4119 | 43 | 47000 | −1 | 0 |
| 9 | 0.0560 | 0.0804 | 0.4800 | 0.3836 | 43 | 32000 | +29 | +30 |
| 10 | 0.0941 | 0.0929 | 0.4587 | 0.3543 | 38 | 46000 | −1 | 0 |
| 11 | 0.2140 | 0.0660 | 0.2880 | 0.4320 | 32 | 38000 | −31 | −30 |
| 12 | 0.1700 | 0.0560 | 0.3870 | 0.3870 | 40 | 21000 | +9 | −10 |
| 13 | 0.1320 | 0.2140 | 0.3270 | 0.3270 | 30 | 20000 | −18 | −16 |
| 14 | 0.1071 | 0.2009 | 0.2860 | 0.4060 | 34 | 20000 | −26 | −25 |
| 15 | 0.0790 | 0.0790 | 0.5000 | 0.3420 | 38 | 49000 | +29 | +30 |
| 16 | 0.1400 | 0.1750 | 0.4350 | 0.2500 | 33 | 29000 | −29 | −28 |
| 17 | 0.1250 | 0.1250 | 0.3000 | 0.4500 | 42 | 34000 | −11 | −10 |
| *18 | 0.2357 | 0.1111 | 0.3266 | 0.3266 | 24 | 15000 | −56 | −55 |
| *19 | 0.0500 | 0.0920 | 0.4290 | 0.4290 | 58 | 25000 | +108 | +109 |
| *20 | 0.1067 | 0.2267 | 0.3333 | 0.3333 | 32 | 15000 | −11 | −10 |
| *21 | 0.0920 | 0.0500 | 0.4290 | 0.4290 | 51 | 3000 | +46 | +47 |
| *22 | 0.1228 | 0.1228 | 0.5088 | 0.2456 | 30 | 53000 | −53 | −52 |
| *23 | 0.1460 | 0.1304 | 0.2700 | 0.4536 | 42 | 1200 | −11 | −10 |
| *24 | 0.0790 | 0.0790 | 0.3710 | 0.4710 | 59 | 250 | not measurable | |
| *25 | 0.2000 | 0.2000 | 0.3700 | 0.2300 | 23 | 56000 | −81 | −80 |
| 26 | 0.0780 | 0.0780 | 0.4220 | 0.4220 | 47 | 48000 | +19 | +20 |
| 27 | 0.1166 | 0.1166 | 0.4268 | 0.3400 | 35 | 55000 | −21 | −20 |
| 28 | 0.1098 | 0.1098 | 0.3902 | 0.3902 | 38 | 49000 | −21 | −20 |
| 29 | 0.0790 | 0.0800 | 0.4700 | 0.3710 | 41 | 44000 | +19 | +20 |
| 30 | 0.0881 | 0.0881 | 0.4119 | 0.4119 | 43 | 47000 | −1 | 0 |
| 31 | 0.1072 | 0.1075 | 0.4376 | 0.3477 | 37 | 53000 | −11 | −10 |
| 32 | 0.0884 | 0.0892 | 0.4592 | 0.3632 | 40 | 47000 | +9 | +10 |

A mark * indicates samples that lie outside the scope of the present invention.

As will be obvious from Table 1, the dielectrics obtained according to the present invention exhibit excellent dielectric properties such as dielectric constants of greater than 30, Q-values of greater than 20,000 (at 1 GHz), and temperature coefficients τf of ±30 (ppm/° C.). The dielectrics that lie outside the scope of the present invention have small dielectric constants, small Q-values, or temperature coefficients τf that exceed 30 in absolute values.

With reference to samples Nos. 7, 8 and 10 of Table 1, the present inventors have further performed experiments by replacing Nd of $Nd_2O_3$ with other rare earth elements. The results were as shown in Table 2. Referring to the samples Nos. 33 to 55 of Table 2, the values a, b, c and d of the sample No. 8 of Table 1 are changed, i.e., the values a and b are changed to 0.0881 and the values c and d are changed to 0.4119. Referring to the samples Nos. 56 to 61, the values a, b, c and d of the sample No. 7 of Table 1 are changed, i.e., the values a and b are changed to 0.1061 and the values c and d are changed to 0.3939. Referring to the samples Nos. 62 to 67, the values a, b, c and d of the sample No. 10 of Table 1 are changed, i.e., the value a is changed to 0.0941, the value b is changed to 0.0929, the value c is changed to 0.4587, and the value d is changed to 0.3543.

TABLE 2

| Sample No. | Rare earth element (Ln) | Dielectric constant εr | Q-value | Temp. coefficient of resonance freq. τf (ppm/°C.) −40~+25° C. | +25~+85° C. | Remarks |
|---|---|---|---|---|---|---|
| 33 | Y | 43 | 36000 | +3 | +5 | Sample No. 8 of Table 1 |
| 34 | 0.1Y.0.9Nd | 42 | 40000 | +1 | +3 | a:0.0881 |
| 35 | La | 44 | 39000 | −20 | −18 | b:0.0881 |
| 36 | 0.1La.0.9Nd | 43 | 36000 | −3 | −3 | c:0.4119 |
| 37 | Ce | 44 | 36000 | −10 | −11 | d:0.4119 |
| 38 | 0.1Ce.0.9Nd | 43 | 30000 | −4 | −3 | |
| 39 | Pr | 42 | 30000 | +5 | +4 | |
| 40 | 0.1Pr.0.9Nd | 43 | 35000 | −1 | −2 | |
| 41 | 0.5Pr.0.5Nd | 43 | 38000 | +3 | +3 | |
| 42 | Sm | 41 | 35000 | −4 | −6 | |
| 43 | 0.1Sm.0.9Nd | 41 | 33000 | −6 | −6 | |
| 44 | 0.5Sm.0.5Nd | 42 | 39000 | −3 | −3 | |
| 45 | Eu | 43 | 33000 | −1 | −2 | |
| 46 | 0.1Eu.0.9Nd | 43 | 37000 | −1 | −2 | |
| 47 | Gd | 41 | 34000 | +1 | +2 | |
| 48 | 0.1Gd.0.9Nd | 42 | 32000 | 0 | +1 | |
| 49 | Dy | 41 | 40000 | +9 | +2 | |
| 50 | 0.1Dy.0.9Nd | 43 | 42000 | −1 | −4 | Sample No. 8 of Table 1 |
| 51 | 0.5Dy.0.5Nd | 43 | 44000 | +3 | +1 | a:0.0881 |
| 52 | Er | 40 | 29000 | +4 | +3 | b:0.0881 |
| 53 | 0.1Er.0.9Nd | 42 | 36000 | +1 | +2 | c:0.4119 |
| 54 | Yb | 39 | 26000 | +6 | +7 | c:0.4119 |
| 55 | 0.1Yb.0.9Nd | 42 | 30900 | +2 | +3 | |

TABLE 2-continued

| Sample No. | Rare earth element (Ln) | Dielectric constant $\epsilon r$ | Q-value | Temp. coefficient of resonance freq. $\tau f$ (ppm/°C.) $-40 \sim +25°$ C. | $+25 \sim +85°$ C. | Remarks |
|---|---|---|---|---|---|---|
| 56 | Pr | 39 | 40000 | −10 | −11 | Sample No. 7 of Table 1 |
| 57 | 0.5Pr.0.5Nd | 39 | 38000 | −14 | −15 | a:0.1061 |
| 58 | Sm | 38 | 42000 | −25 | −26 | b:0.1061 |
| 59 | 0.5Sm.0.5Nd | 38 | 42000 | −21 | −22 | c:0.3939 |
| 60 | Dy | 38 | 38000 | −9 | −12 | d:0.3939 |
| 61 | 0.5Dy.0.5Nd | 38 | 40000 | −13 | −15 | |
| 62 | Pr | 38 | 37000 | +4 | +3 | Sample No. 10 Table 1 |
| 63 | 0.5Pr.0.5Nd | 38 | 33000 | −3 | +2 | a;0.0941 |
| 64 | Sm | 37 | 43000 | −5 | −7 | b:0.0929 |
| 65 | 0.5Sm.0.5Nd | 38 | 44000 | −3 | −3 | c:0.4587 |
| 66 | Dy | 36 | 35000 | +5 | +1 | d:0.3543 |
| 67 | 0.5Dy.0.5Nd | 37 | 38000 | +3 | +1 | |

It will be understood from Table 2 that even when other rare earth oxides are used instead of $Nd_2O_3$, there are still obtained dielectric ceramic compositions having dielectric constants of greater than 36, Q-values of greater than 26000, which are sufficiently practicable properties.

The present inventors have further experimented with adding a variety of metal oxides to the main components of the composition of the sample No. 8 of Table 1. The results were as shown in Tables 3 and 4.

TABLE 3

| Sample No. | Amount of additive parts by weight) | | Dielectric constant $\epsilon r$ | Q-value | Temp. coefficient of resonance freq. $\tau f$ (ppm/°C.) $-40 \sim +25°$ C. | $+25 \sim +85°$ C. | Remarks |
|---|---|---|---|---|---|---|---|
| 68 | ZnO | 0.2 | 44 | 24000 | −4 | −4 | The amount of additives |
| 69 | NiO | 0.2 | 44 | 22000 | +1 | −2 | is per 100 parts by |
| 70 | NiO | 2.0 | 43 | 12000 | −4 | −7 | weight of main |
| 71 | $SnO_2$ | 2.0 | 39 | 35000 | −3 | −1 | components of the |
| 72 | $SnO_2$ | 4.0 | 38 | 29000 | −5 | −4 | compsition of sample |
| 73 | $SnO_2$ | 6.0 | 37 | 18000 | −7 | −6 | No. 8 of Table 1. |
| 74 | $Ca_2O_4$ | 2.0 | 41 | 30000 | −6 | −5 | |
| 75 | $Ca_2O_4$ | 4.0 | 40 | 19000 | −6 | −5 | |
| 76 | $MaCO_3$ | 2.0 | 44 | 35000 | −3 | −2 | |
| 77 | $MaCO_3$ | 4.0 | 44 | 23000 | −2 | −1 | |
| 78 | $MaCO_3$ | 6.0 | 43 | 14000 | −3 | −2 | |
| 79 | $ZnO_2$ | 2.0 | 41 | 38000 | −1 | 0 | |
| 80 | $ZnO_2$ | 4.0 | 40 | 21000 | −1 | 0 | |
| 81 | $ZnO_2$ | 6.0 | 40 | 12000 | −2 | −1 | |
| 82 | $WO_3$ | 2.0 | 42 | 35000 | +9 | +8 | |
| 83 | $WO_3$ | 4.0 | 42 | 26000 | +9 | +7 | |
| 84 | $WO_3$ | 6.0 | 41 | 15000 | +12 | +10 | |
| 85 | $Li_2CO_3$ | 0.5 | 44 | 25000 | −2 | −1 | |
| 86 | $Li_2CO_3$ | 2.0 | 43 | 15000 | −1 | 0 | |
| 87 | $Pb_2CO_3$ | 0.5 | 43 | 21000 | −8 | −8 | |
| 88 | $Pb_2CO_3$ | 2.0 | 33 | 13000 | −10 | −12 | |
| 89 | Sc | 0.5 | 43 | 24000 | −4 | −4 | |
| 90 | Sc | 2.0 | 42 | 15000 | −5 | −6 | |
| 91 | $V_2O_5$ | 0.5 | 42 | 33000 | −2 | 0 | |
| 92 | $V_2O_5$ | 2.0 | 41 | 16000 | −3 | −1 | |
| 93 | CuO | 0.5 | 43 | 21000 | −7 | −7 | |
| 94 | CuO | 2.0 | 43 | 10000 | −10 | −11 | |
| 95 | $SiO_2$ | 0.5 | 43 | 25000 | −3 | −1 | |
| 96 | $SiO_2$ | 2.0 | 42 | 14000 | −3 | −1 | |
| 97 | MgCO | 0.5 | 43 | 20000 | −3 | −5 | |
| 98 | MgCO | 2.0 | 43 | 11000 | −4 | −6 | |
| 99 | $Cr_2O_3$ | 0.5 | 43 | 30000 | −3 | −3 | |
| 100 | $Cr_2O_3$ | 2.0 | 42 | 18000 | −3 | −4 | |
| 101 | $B_2O_3$ | 0.5 | 44 | 30000 | +3 | +3 | |
| 102 | $B_2O_3$ | 2.0 | 43 | 15000 | +3 | +2 | |

TABLE 4

| Sample No. | Amount of additive parts by weight) | | Dielectric constant $\epsilon r$ | Q-value | Temp. coefficient of resonance freq. $\tau f$ (ppm/°C.) $-40 \sim +25°$ C. | $+25 \sim +85°$ C. | Remarks |
|---|---|---|---|---|---|---|---|
| 103 | $GeO_2$ | 0.5 | 42 | 30000 | −5 | −4 | The amount of additives |
| 104 | $GeO_2$ | 2.0 | 42 | 13000 | −6 | −5 | is per 100 parts by |
| 105 | $Sb_2O$ | 0.5 | 40 | 28000 | −4 | −3 | weight of main |
| 106 | $Sb_2$ | 2.0 | 39 | 19000 | −5 | −4 | components of the |
| 107 | $Nb_2O_5$ | 2.0 | 45 | 39000 | +2 | +3 | compsition of sample |
| 108 | $Nb_2O_5$ | 4.0 | 46 | 30000 | +3 | +3 | No. 8 of Table 1. |

TABLE 4-continued

| Sample No. | Amount of additive (parts by weight) | | Dielectric constant εr | Q-value | Temp. coefficient of resonance freq. τf (ppm/°C) | | Remarks |
|---|---|---|---|---|---|---|---|
| | | | | | −40~+25° C. | +25~+85° C. | |
| 109 | Nb₂O₅ | 6.0 | 46 | 18000 | +3 | +4 | |
| 110 | Nb₂O₅ | 1.0 | 44 | 47000 | −1 | 0 | |
| 111 | Ta₂O₅ | 2.0 | 45 | 41000 | −1 | +1 | |
| 112 | Ta₂O₅ | 4.0 | 46 | 40000 | −1 | +1 | |
| 113 | Ta₂O₅ | 6.0 | 46 | 16000 | 0 | +1 | |
| 114 | Ta₂O₅ | 1.0 | 44 | 47000 | −1 | 0 | |

It will be understood from Tables 3 and 4 above that the characteristics are deteriorated when predetermined metal oxides are added to the compositions which have been blended with $Nd_2O_3$ that is a rare earth oxide compared with those of when no metal oxide is added. However, the dielectric ceramic compositions still exhibit dielectric constants of greater than 33, Q-values of greater than 11,000 and absolute values of temperature coefficients τf of not greater than 12, which are sufficiently practicable values. When $Nb_2O_5$ and $Ta_2O_5$ are added in amounts of smaller than 4% by weight, dielectric constants are greatly improved compared with those of when they are not added though the Q-values and temperature coefficients are slightly deteriorated.

As described above in detail, the dielectric ceramic composition of the present invention is a composite oxide containing a rare earth element (Ln), Al, Ca and Ti as metal elements. By adjusting these elements to lie within a particular range, it is allowed to obtain a dielectric ceramic composition having a large dielectric constant, a large Q-value and a small temperature coefficient of resonance frequency at high frequencies. When used for a resonator or as a material of circuit board for high-frequency applications, therefore, the dielectric ceramic composition exhibits satisfactory properties.

We claim:

1. A dielectric ceramic composition expressed by the following formula $$aLn_2O_x \cdot bAl_2O_3 \cdot cCaO \cdot dTiO_2$$

wherein Ln denotes a rare earth element, and a, b, c, d and x are numerals satisfying the following relationships:
 a+b+c+d=1,
 0.056≦a≦0.214,
 0.056≦b≦0.214,
 0.286≦c≦0.500,
 0.230<d<0.470 and
 3≦x≦4.

2. A dielectric ceramic composition according to claim 1, wherein the rare earth element (Ln) in said formula is one selected from the group consisting of Nd, Y, La, Ce, Pr, Sm, Eu, Gd, Dy, Er, and Yb.

3. A dielectric ceramic composition according to claim 1 wherein a, b, c, d and x in said formula, are numerals satisfying the following relationships:
 a+b+c+d=1,
 0.078≦a≦0.1166
 0.078≦b≦0.1166
 0.390≦c≦0.47,
 0.340≦d≦0.422, and
 3≦x≦4.

4. A dielectric ceramic composition expressed by the following formula:

$$aNd_2O_3 \cdot bAl_2O_3 \cdot cCaO \cdot dTiO_2$$

wherein a, b, c, and d are numerals satisfying the following relationships:
 a+b+c+d=1,
 0.056≦a≦0.214,
 0.056≦b≦0.214,
 0.286≦c≦0.500,
 0.230<d<0.470 and
 3≦x ≦4.

5. A dielectric ceramic composition expressed by the following formula $$aLm_2O_x \cdot bAl_2O_3 \cdot cCaO \cdot dTiO_2$$

wherein Lm denotes a combination of Nd and other rare earth element selected from the group consisting of Y, La, Ce, Pr, Sm, Eu, Gd, Dy, Er and Yb, said Nd and other rare earth element being present at an atomic ratio of 9:1 to 1:9, and a, b, c, d and x are numerals satisfying the following relationships:
 a+b+c+d=1,
 0.056≦a≦0.214,
 0.056≦b≦0.214,
 0.286≦c≦0.500,
 0.230<d<0.470 and
 3≦x≦4.

6. A dielectric ceramic composition comprising (A) a major component expressed by the following formula:

$$aLn_2O_x \cdot bAl_2O_3 \cdot cCaO \cdot dTiO_2$$

wherein Ln denotes a rare earth element, and a, b, c, d and x are numerals satisfying the following relationships:
 a+b+c+d=1,
 0.056≦a≦0.214,
 0.056≦b≦0.214,
 0.286≦c≦0.500,
 0.230<d<0.470 and
 3≦x≦4 and (B) a finite damount up to 6% by weight, based on the main component, of a minor component selected from the group consisting of ZnO, NiO, SnO₂, Co₃O₄, MnCO₃, ZrO₂, WO₃, LiCO₃, Rb₂CO₃, Sc₂O₃, V₂O₅, CuO, SiO₂, MgCO₂, Cr₂O₃, B₂O₃, GeO₂, Sb₂O₅, Nb₂O₅ and Ta₂O₅.

7. A dielectric ceramic composition according to claim 6 wherein said minor component is Nb₂O₅ or Ta₂O₅ and is present in an amount of 1 to 4% by weight based on the major component.

8. The dielectric ceramic composition of claim 5 wherein said Nd and other rare earth elements are present at an atomic ratio of 9:1 to 5:5.

* * * * *